United States Patent [19]

Banner

[11] 3,793,997
[45] Feb. 26, 1974

[54] ENGINE LIQUID FLOW INDICATING DEVICE MEANS

[76] Inventor: Philip Michael Banner, 28-Oxford Rd., Massapequa, N.Y. 11758

[22] Filed: Dec. 15, 1971

[21] Appl. No.: 208,072

[52] U.S. Cl. ............................ 123/41.15, 73/118
[51] Int. Cl. ................................... G01m 15/00
[58] Field of Search ...... 73/347, 118, 228; 116/117; 200/81.9 R; 123/41.15

[56] References Cited
UNITED STATES PATENTS

| | | | |
|---|---|---|---|
| 3,292,427 | 12/1966 | Mattson | 73/118 |
| 1,773,756 | 8/1930 | Schlaich | 116/117 R UX |
| 2,957,348 | 10/1960 | Walker, Jr. | 73/347 |
| 2,407,810 | 9/1946 | Boddy | 73/347 |
| 1,902,932 | 3/1933 | Zubaty | 73/347 |
| 2,601,678 | 6/1952 | Beatty | 73/228 X |
| 2,018,403 | 10/1935 | Hussar | 73/118 |
| 1,693,309 | 11/1928 | Mettler | 200/81.9 R |
| 3,148,254 | 9/1964 | Clason | 200/81.9 R |
| 3,355,560 | 11/1967 | Murphy et al. | 73/228 X |
| 3,198,901 | 8/1965 | Kapadi | 200/81.9 R |
| 1,874,263 | 8/1932 | Fahrney | 73/347 X |

FOREIGN PATENTS OR APPLICATIONS 614,318   11/1931   Germany ............................ 73/228

*Primary Examiner*—Jerry W. Myracle

[57] ABSTRACT

Liquid flow sensors connected to an engine or power means requiring liquid cooling. Sensors measure liquid flow velocity and volume factors on a visual flow gauge in increments of low, medium and high volume readouts in conjunction with a warning means, for liquid flow and pressure indication.

7 Claims, 8 Drawing Figures

PATENTED FEB 26 1974   3,793,997

ENGINE LIQUID FLOW INDICATING DEVICE MEANS

This invention relates to a engine liquid flow indication means adaptable to all kinds of engines electric motors or other means of power that require a liquid coolant. This invention also relates to indication of liquids of any description, for any use, where flow measurement & control is important.

This invention is important to engine owners and manufacturers who warranty their products. The former art concerns itself with the temperature of engines wherein the temperature is controlled by means of a thermostat that opens and closes at predetermined settings. Should a thermostat become inoperative, a fan belt break, a radiator leak, a hose break or any other malfunction occur, the temperature rises beyond the normal operating range quickly, causing overheating. When an engine is shut down the rise of temperature is rapid, usually reaching the boiling point causing internal or external heat damage. A common cause of engine destruction, major overhauls and engine failure occurs as a result of engine overheating. The effect of overheating for any prolonged period results in major damage to internal parts that expand causing accelerated wear & tear, cracking blocks or component parts. The present art of controlling engine temperature is accomplished by temperature gauges that record the engine operating water temperature or by warning lights and buzzers that signal an alarm when the engine is on the verge of overheating or usually after the engine has already overheated. The temperature control of an engine is dependent upon the flow of liquids within it, therefore, flow control is an important function creating the necessity for this invention. Flow control is also important in pumping operations of liquids for cooling or moving liquids through pipes where a failure would be averted by this invention. My observations concerning engine failures and loss of equipment or damage by overheating that could have been avoided is conclusive proof that additional apparatus must be employed to detect a malfunction before it occurs therefore saving the useful life of the engine or parts.

This invention distinctly provides adequate means of determining and controlling liquid flow for engine cooling and other transport purposes. Rather than wait until overheating occurs or causing damage such as explained in the prior art, this invention proposes to warn an operator of any engine when the malfunction has occured causing a loss in liquid flow of an engine. In addition to a warning or alarm system means can also be provided to automatically shut down an engine, repair the problem and then continue on your journey or operations of engine plants. The water or liquid flow sensors will measure water flow and electrically give readout information to the operator on the amount of flow at various load conditions, useful in the operation of an engine. The readout is accomplished by a flow gauge that has a low volume alarm position plus many other positions from low to high volume flow. This engine liquid flow control means also has provisions to sound an alarm in the low position allowing the engine to be shut-off prior to any damage. Sensors are also supplied on important parts of the engine such as found on gas and diesel engines at places where breakage usually occurs. Reference is directed to the fan belt; water pump or other parts that should have signal means of detecting breakage that would be convenient to operators in finding the problem. The invention offers both visual and alarm means of detecting engine failure primarily by measuring the flow of liquids in an engine for cooling purposes which heretofore has not been accomplished. The automobile engines quickly burn gaskets after overheating as compared to a industrial or heavy duty diesel built of heavier parts that can take more punishment. In the case of diesels and industrial engines that cost so much more and are under heavier loads usually, it is also important not to overheat an engine. The manufacturers spend fortunes to warranty their products and it is this cost that added to other costs makes the product so expensive. Also, in industrial engine set-ups there may be only one operator in attendance designated to operate many machines where if he had a engine liquid flow control means built into the engine he would be in a position to use the engine at the most efficient water flow point plus have the advantage of a alarm system that warns in cases of low volume, lower than required for normal operation of an engine. Where required an automatic shut-off would be incorporated with the meter as optional equipment. In the case of boat engines where the engines are constantly under heavy load pushing against bodies of water and frictional surfaces it is important to note the flow of sea or other coolants. The measurement of water in the inlet pipe recorded to a meter in view of an operator, having an alarm would be extremely valuable for operating an engine properly and safeguard against a clogged inlet, broken water pumps or driving means or a broken hose. Marine engines are very expensive to replace or repair, they need this protection.

An internal combustion engine is essentially a heat engine. That is, it derives its power from burning fuel. Unfortunately, not all of this heat can be utilized, and, if allowed to remain in the engine, it would soon destry it. The temperature of the burning air-fuel mixture is about 4500° F. Compare this with boiling point of water, 212°F. If this unused heat were not removed, the engine would soon melt. The melting point of iron is 2500° F. Coolants pick up the excess combustion heat as it is circulated through the engines by a centrifugal-type pump, delivered to the radiator where it is cooled, and then returned to the water pump for recirculation. Most systems operate under an elevated pressure, about 14 psi, and contain a thermostat to prevent coolant circulation when the engine is cold to promote rapid warm-up. A by-pass system provides circulation through the cylinder heads and block while the thermostat is closed to ensure equalized block expansion. The design of every cooling system includes using radiators where heat is transferred to the atmosphere by the coolant. Cooling heads, blocks, lubricating oil and many other engine parts is accomplished by proper engine cooling, flow of coolants and sufficient pressure in the pressure type systems employed on modern engines today. Such systems under 14 psi pressure changes the boiling point to 235° F. They have a pressure type radiator cap that is held against its seat at 14 psi. It opens under higher pressure to protect the radiator. Corrosion is another common problem affecting water passage and cooling wherein the corrosion is a rusting process that takes place on the surface of ferrous metals in contact with oxygen, heat accelerates the process. Corrosion forms as rust on the inner surfaces of the engines water passages and the minute particles circulate with the coolant. Because of the natural attraction of these rust particles for each other and for other certain metals, deposits form in the radiator core passages and the water recesses of the engine block. The three major results of corrosion are clogging of the radiator, poor heat transfer and leaking. Radiation and heat transfer are impaired as the deposits continue to accumulate, resulting in overheating, and, eventually a clogged radiator. Corrosion is the cause of many leaks that develop in cooling systems and also contributes to the malfunction of thermostats. Other problems attendant in cooling systems are scaling, dirty water, grease and oil from leaking cylinder head gaskets that form a dirt and sediment holding film that clogs the radiator and other parts of the engine causing problems to valves, rings and pistons.

When a cooling system becomes inoperative, engine temperatures rise and preignition takes place. Reduction in power becomes apparent, gasoline consumption increases and there is increased need for lubricating oil. While it is true that pressure systems allow an operating increase in water temperature of 35° before the water boils it tends to cause even more damage when it does boil out at higher temperatures having greater damage potential. The flow of water, the pressure of at which it operates and corrosion or scaling are all contributing factors in cooling modern engines.

The specific needs of water cooled marine engines deffer from other engines particularly where the sea or lake water become the source of coolant which is very common, it eliminates radiators and cooling equipment using the cool sea water directly. Such engines are always under great load and it would be important to know the degree of water flow in addition to having means of reporting pressure in the system and an alarm or warning device to safeguard its use. Certainly, the flow control and pressure control plus warning system, will be important to all engines and prolong their useful life expectency.

Accordingly, a principal object of the invention is to provide new and improved Engine Liquid Flow Control Means.

Another object of the invention is to provide new and improved Engine Liquid Flow Indication Means for Marine Engines, Industrial Engines, Truck and Car Engines and all other engines requiring a flow of coolants.

Another object of the invention is to provide new and improved liquid flow sensors that measure the specific flow of liquids and pressure sensing.

Another object of the invention is to provide new and improved flow control indicating means having a bearing upon the coolant efficiency level and showing flow and pressure upon visual gauges for observation and operation of engines.

Another object of the invention is to provide new and improved alarm and notification means of a malfunction in an engine experiencing flow or pressure problems.

Another object of the invention is to provide new and improved liquid flow control means for controlling liquids or coolants other than in engines, where it is important to know the amount of flow or pressure and have an alarm means.

Another object of the invention is to provide new and improved liquid flow control means that will reduce engine major failures, increase engine life and reduce the loss of capital investment in equipment used for pleasure and industry.

These and other objects of the invention will be apparent in the following specifications and drawings, of which, FIG. 1 through 4 shows various sensors that controls water flow measurement and having alarm means plus pressure controls.

FIG. 8 also shows fuse protection, alarm test switch and a master switch.

Figure 1:
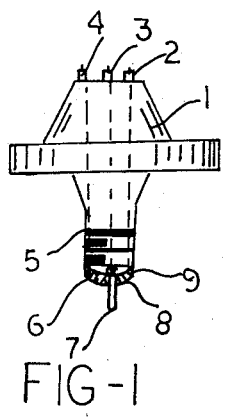

Referring to FIG. 1, there is shown the developed sending unit, a sensor body 1 having electrical contacts 2, 3 & 4, a threaded base 5, a wire attaching means 6, a flapper switch 7, resistance wire contact 8 and holding means 9. Accordingly, ground is made by contact of the sensor body 1 to which it is attached or by separate body terminal not shown. One wire such as 3 carries current into the sensor switch 7 which in various positions transmits current to wire contact 8 relayed back through the wiring 2 or 4 for gauge or alarm use.

Figure 2:
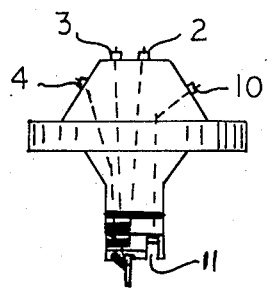

FIG. 2 shows another sensor 1 having a means of reporting pressure. Wire 10 is connected to a pressure sensor 11. Current contact is made at 2 that is internally connected to 11 which at various pressures produces variable signal means. In FIG. 2 the other wires 3 & 4 are used solely for flow indication while on the same sensor wiring 2 & 10 are used for pressure indication. Operational pressures in engines and flow control will be accomplished by this sensor.

Figure 3:
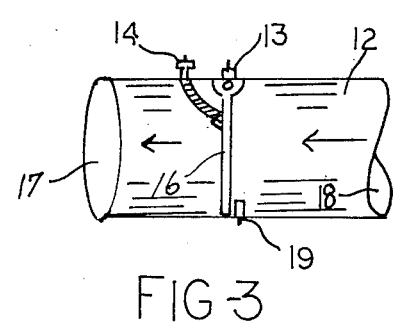

FIG. 3 shows another sensor 12 as a tubing having flow indication sensor means. The apparatus in 12 is attached to the tubing 12 by waterproofing methods. The contact wire 13 is attached to a flapper flow valve 16 with another terminal contact 14 connected to a resistance wire 15. The direction of water flow 17 corresponds to the inlet 18, an alarm switch 19 shown in the closed position. The intermediate positions of part 16 upon the coil 15 produces variable current on terminal 14 carried to the alarm and indication means shown in FIG. 8.

Figure 4:
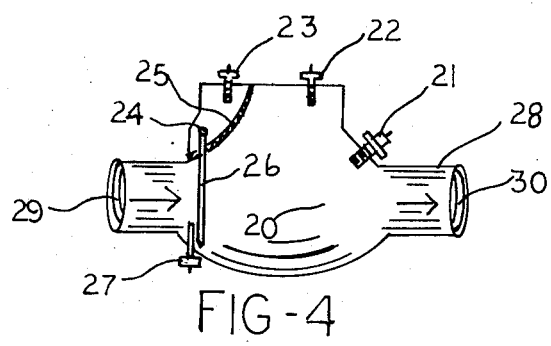

FIG. 4 shows another self contained sensor means 20, having a pressure sensor 21 with a terminal, a grounding terminal 22, a flow switch terminal 23 and a flapper switch valve 26 connected to the body 20 by means of a pin 24 allowing the flapper valve 26 to operate rotatably. The resistance contact 25 carries variable current to the flow switch 23 then transmitted to the indication unit. An alarm terminal switch 27 operates a seperate wire to the alarm on the indication unit. Inside thread means 28 is shown as one means of attachment, the direction of flow is shown going in 29 and out 30.

Figure 5:
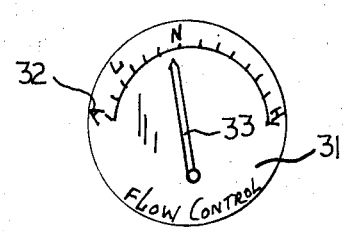
FIGS. 5, 6 & 7 show various gauges embodied in this invention.

FIG. 5 shows a flow indication gauge 31 having a line of flow degree markings 32 and a needle pointer 33. This gauge 31 shows the various flow conditions that the sensors FIGS. 1 through 4 control. This affords visual indication in addition to alarm means automatically sounding when flow is lower than the prescribed levels for safe operation of an engine suggested by manufacturers.

Figure 6:
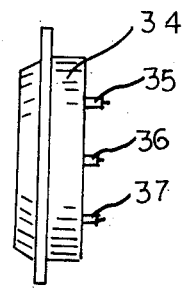

FIG. 6 shows a side view of a gauge having two contacts for flow indication 34 & 35 and two contacts for pressure control 36 & 37 should a single gauge be employed for both flow and pressure indication together.

Figure 7:
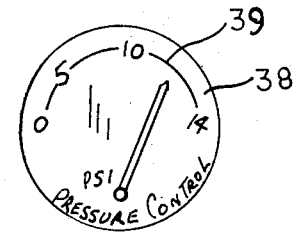

FIG. 7 shows a pressure indication gauge 38 having a pressure marking 39 showing zero to 14 pounds pressure, common to pressure systems today.

Figure 8:
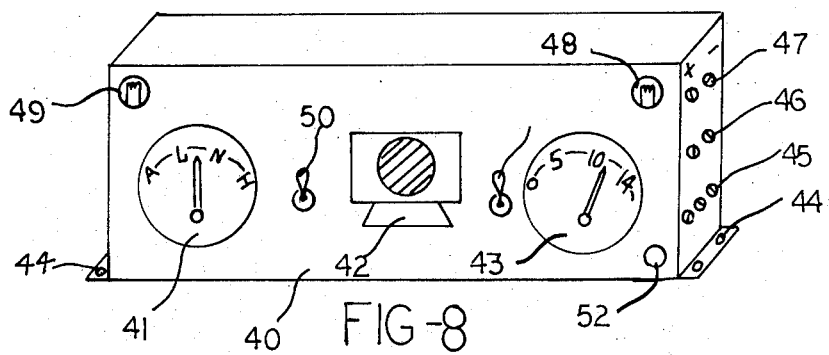
FIG. 8 shows a control housing for the gauges, alarm and connections having means to secure same to any flat surface.

FIG. 8 shows an control unit 40 having a flow indication gauge 41 and a alarm means 42, a pressure gauge 43, securing means 44, electrical contacts for flow meter and alarm means 45, contacts for pressure indication means 46, input current terminals 47, a visual light means 48 & 49 for normal and emergency detection, having a master switch 50 and an alarm test means 51, a fuse 52. Flashing means is not shown for operation of lights 48 & 49 which is an important signal means in detecting improper conditions instead of or with an alarm means. The economical features of lights versus more costly equipment may be a factor important to the purchaser.

My experience as a Transportation Advisor to a Foreign Government handling engine maintenance problems for on and off-road equipment has shown that in a temperate zone under loaded conditions a big engine can be destroyed in minutes. While pressure systems do raise the boiling point 35° F the damage affecting an engine at the greater point is more severe and longer lasting than at the lower level. The viscosity of lubricants is also affected along with heat that warps and cracks engines, burns gaskets, blows out a radiator and causes loss of investment that could be prevented. In cases involving large diesels improper cooling systems and undetected loss of the coolants cost as much as the original investment in the entire tractor. Drivers have many activities behind the wheel of a large unit involving traffic and safety, constant shifting of gears leaving little freedom or free time. A flow gauge and alarm would signal a malfunction giving the driver a chance to pull over safely. If the driver was experiencing trouble with a particular truck he could watch the flow indicating means to see where the flow is most efficient and try to operate the vehicle at that speed. The constant reduction of flow in a given vehicle would be caused by restrictions of scale or corrosion or anything else but the driver will know it is occuring and by making a report the motor could be checked out and saved from major overheating damage. Some of my other experiences as an owner of a large diesel engine service and operator of over the road trucks has proven the importance of proper engine cooling and maintenance and the need for additional means of control. In the case of boat engines always under full load and using sea water as a means of coolant an engine cracks almost immediately or burns gaskets, warps heads and it is very expensive to repair. Parts and service costs more, and why not prevent the unnecessary event of engine failure that on a boat under power could result in a hazardous fire where fuel tanks are stored. On my boat, a twin engine Chris-Craft I have evaluated the efficiency of my water systems by using a prototype flow control to great advantage, it showed the levels of flow at different speeds which varied with the engine tested and in one case set off the alarm when one inlet stopped working when a broken inlet valve stopped the water inlet supply. Boats sometimes experience clogged inlets or foreign matter in the water pump restricting same wherein a flow control and alarm would help considerably. The advantages of flow and pressure control in providing indicating means of liquid flow having predetermined alarm settings for all uses is furter adaptable to be carried forth on computors for documentation of information. Visual and audio control will afford new information about the heating characteristics of engines under different loads, at different speeds having different restrictions, different operators, using different fuels and lubricants in variable climatic conditions. The relationship of water flow and pressure control to temperature control is inseperable to the efficient safe opeation of any engine.

I claim:

1. A monitoring device for determining the condition of an engine cooling system comprising:
   An engine having a liquid cooling system;
   a sensor body mounted in liquid communication with said cooling system;
   a flow responsive element mounted in said sensor body;
   a first sensing means actuated by said flow responsive element for producing an electrical signal indicative of no flow of engine coolant;
   a second sensing means actuated by said flow responsive element for producing an electrical signal indicative of the flow rate of engine coolant; and
   indicator means attached to said first and second sensing means.

2. Apparatus as in claim 1 and further including a pressure sensing means in the sensor body and indicating means connected to said pressure sensing means.

3. Apparatus as in claim 1 in which the sensor body is in the form of a unitary structure having a single threaded fitting for attachment into the cooling system.

4. Apparatus as in claim 1 in which the sensor body is in the form of a unitary structure having inlet and outlet parts for attachment into the cooling system.

5. Apparatus as in claim 1 in which the engine is a marine engine having a sea water cooling system.

6. Apparatus as in claim 1 wherein the indicator means attached to the flow responsive element includes dial means for continuously indicating the coolant flow, said dial means being calibrated to show low normal and high readings of coolant flow for said engine.

7. Apparatus as in claim 1 in which the indicator means is mounted at a point remote from the engine and said indicator means includes warning lights and an audio alarm means.

* * * * *